United States Patent
Aziz et al.

(10) Patent No.: US 10,837,404 B2
(45) Date of Patent: Nov. 17, 2020

(54) THRUST REVERSER WITH BLOCKER DOOR SYSTEM

(71) Applicant: Rohr, Inc., Chula Vista, CA (US)

(72) Inventors: Peter W. Aziz, San Diego, CA (US); Pablo T. Sanz Martinez, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 150 days.

(21) Appl. No.: 16/031,304

(22) Filed: Jul. 10, 2018

(65) Prior Publication Data
US 2020/0018258 A1 Jan. 16, 2020

(51) Int. Cl.
*F02K 1/00* (2006.01)
*F02K 1/72* (2006.01)

(52) U.S. Cl.
CPC ............ *F02K 1/72* (2013.01); *F05B 2250/34* (2013.01); *F05B 2260/50* (2013.01)

(58) Field of Classification Search
CPC ..... F02K 1/72; F02K 1/70; F02K 1/76; F02K 1/62; F02K 1/625; F05B 2250/34
See application file for complete search history.

(56) References Cited

U.S. PATENT DOCUMENTS

| | | | |
|---|---|---|---|
| 3,503,211 A * | 3/1970 | Holman | F02K 1/72 60/229 |
| 3,981,451 A * | 9/1976 | Prior | F02K 1/72 239/265.31 |
| 6,050,522 A | 4/2000 | Brossier et al. | |
| 9,255,547 B2 | 2/2016 | Beardsley | |
| 2014/0373506 A1 | 12/2014 | Kusel | |
| 2017/0107944 A1 | 4/2017 | Kawai et al. | |
| 2018/0106216 A1 | 4/2018 | Jolivet | |
| 2018/0372024 A1* | 12/2018 | Pautis | F02K 1/72 |
| 2019/0003421 A1* | 1/2019 | Pautis | F02K 1/72 |

FOREIGN PATENT DOCUMENTS

| | | |
|---|---|---|
| FR | 2379705 B1 | 11/1980 |
| GB | 1343888 A | 1/1974 |

OTHER PUBLICATIONS

EP search report for EP19185545.1 dated Dec. 3, 2019.

* cited by examiner

*Primary Examiner* — Todd E Manahan
*Assistant Examiner* — Edwin Kang
(74) *Attorney, Agent, or Firm* — Getz Balich LLC (57) ABSTRACT

An assembly is provided for an aircraft propulsion system. This assembly includes a fixed structure, a translating structure, a blocker door and a rigid linkage. The translating structure is configured to translate relative to the fixed structure. The blocker door extends between a blocker door first end and a blocker door second end. The translating structure is pivotally attached to the blocker door at the blocker door first end. The rigid linkage includes a first pivot attachment, a second pivot attachment and a third pivot attachment. The first pivot attachment is coupled to the fixed structure. The second pivot attachment is coupled to the translating structure. The third pivot attachment is coupled to the blocker door at the blocker door second end.

19 Claims, 7 Drawing Sheets

THRUST REVERSER WITH BLOCKER DOOR SYSTEM

BACKGROUND

1. Technical Field

This disclosure relates generally to an aircraft propulsion system and, more particularly, to a thrust reverser with one or more blocker doors.

2. Background Information

An aircraft propulsion system may include a thrust reverser for producing reverse thrust during aircraft landing. A thrust reverser may include an array of blocker doors, which lay against a translating sleeve when stowed and which project radially inwards into a bypass duct when deployed. To move the blocker doors from their stowed positions to their deployed positions, each blocker door is typically connected to a drag link. A typical drag link extends between and is pivotally coupled to a respective blocker door and an inner fixed structure, which defines an inner peripheral portion of the bypass duct. With such a configuration, the drag link extends completely radially across the bypass duct when the respective blocker door is stowed. Presence of the drag link in the bypass duct increases drag within the bypass duct. In addition, gaps between the blocker doors and the translating sleeve when the blocker doors are stowed create further flow disturbances within the bypass duct which further increases drag. Therefore, there is a need in the art for an improved thrust reverser system that can reduce drag within a bypass duct.

SUMMARY OF THE DISCLOSURE

According to an aspect of the present disclosure, an assembly is provided for an aircraft propulsion system. This assembly includes a fixed structure, a translating structure, a blocker door and a rigid linkage. The translating structure is configured to translate relative to the fixed structure. The blocker door extends between a blocker door first end and a blocker door second end. The translating structure is pivotally attached to the blocker door at the blocker door first end. The rigid linkage includes a first pivot attachment, a second pivot attachment and a third pivot attachment. The first pivot attachment is coupled to the fixed structure. The second pivot attachment is coupled to the translating structure. The third pivot attachment is coupled to the blocker door at the blocker door second end.

According to another aspect of the present disclosure, another assembly is provided for an aircraft propulsion system. This assembly includes a fixed structure, a translating structure, a blocker door and a linkage. The fixed structure includes a track. The translating structure is configured to translate relative to the fixed structure. The blocker door is pivotally attached to the translating structure. The linkage includes a first pivot attachment, a second pivot attachment and a third pivot attachment. The first pivot attachment is configured as or otherwise includes a carriage coupled with and adapted to ride along the track. The second pivot attachment is coupled to the translating structure. The third pivot attachment is coupled to the blocker door at the blocker door second end.

According to still another embodiment of the present disclosure, another assembly is provided for an aircraft propulsion system. This assembly includes a nacelle translating structure and a folding blocker door. The folding blocker door is configured to move between a stowed position and a deployed position in which the folding blocker door projects radially inward into a bypass flowpath of the aircraft propulsion system. The folding blocker door includes an outer panel and an inner panel. The outer panel is configured between and is pivotally attached to the nacelle translating structure and the inner panel.

The rigid linkage may extend between a first linkage end and a second linkage end. The first pivot attachment may be between the second pivot attachment and the third pivot attachment. The second pivot attachment may be at the first linkage end. The third pivot attachment may be at the second linkage end.

The first pivot attachment may be configured as or otherwise include a carriage that rides within a track of the fixed structure.

The carriage may be configured as or otherwise include a roller.

A first portion of the track may follow a straight trajectory. A second portion of the track may follow a curved trajectory.

The blocker door may be configured as a folding blocker door that includes an outer panel and an inner panel. The outer panel may be configured between and pivotally attached to the translating structure and the inner panel. The third pivot attachment may be coupled to the inner panel.

The outer panel, the inner panel, the translating structure and the rigid linkage may be configured together as a four-bar link system.

The outer panel may extend between a first outer panel end and a second outer panel end. The outer panel may be pivotally attached to the inner panel at the first outer panel end. The outer panel may be pivotally attached to the nacelle translating structure at the second outer panel end.

The first outer panel end may be axially forward and radially inward of the second outer panel end when the folding blocker door is in the deployed position.

The blocker door may be configured to move between a stowed position and a deployed position in which the blocker door projects radially inward into a bypass flowpath of the aircraft propulsion system.

The translating structure may be configured as or otherwise include a translating cascade structure.

The first portion may be substantially parallel with a centerline of the aircraft propulsion system. The second portion may curve radially inward towards the centerline as the second portion extends axially away from the first portion.

The outer panel may extend between a first outer panel end and a second outer panel end. The outer panel may be pivotally attached to the inner panel at the first outer panel end. The outer panel may be pivotally attached to the nacelle translating structure at the second outer panel end. The first outer panel end may be axially forward and radially inward of the second outer panel end when the folding blocker door is in the deployed position.

The nacelle translating structure may translate from a forward position to an aft position as the folding blocker door moves from the stowed position to the deployed position. The folding blocker door may be folded when the nacelle translating structure is in the forward position and may remain folded when the nacelle translating structure is in an intermediate position between the forward position and the aft position.

The assembly may also include a nacelle fixed structure and a linkage. The linkage may extend between a first linkage end and a second linkage end. The linkage may be pivotally attached to the nacelle translating structure at the first linkage end. The linkage may be pivotally attached to the inner panel at the second linkage end. The linkage may be pivotally attached to the nacelle fixed structure at a position between the first linkage end and the second linkage end.

The linkage may be pivotally attached to the nacelle fixed structure through a carriage that moves within a track.

The assembly may also include a biasing device and/or a stop. The biasing device may be configured to bias the inner panel away from the outer panel. The stop may be configured to limit pivoting between the inner panel and the outer panel.

The foregoing features and the operation of the invention will become more apparent in light of the following description and the accompanying drawings.

DETAILED DESCRIPTION

Figure 1:
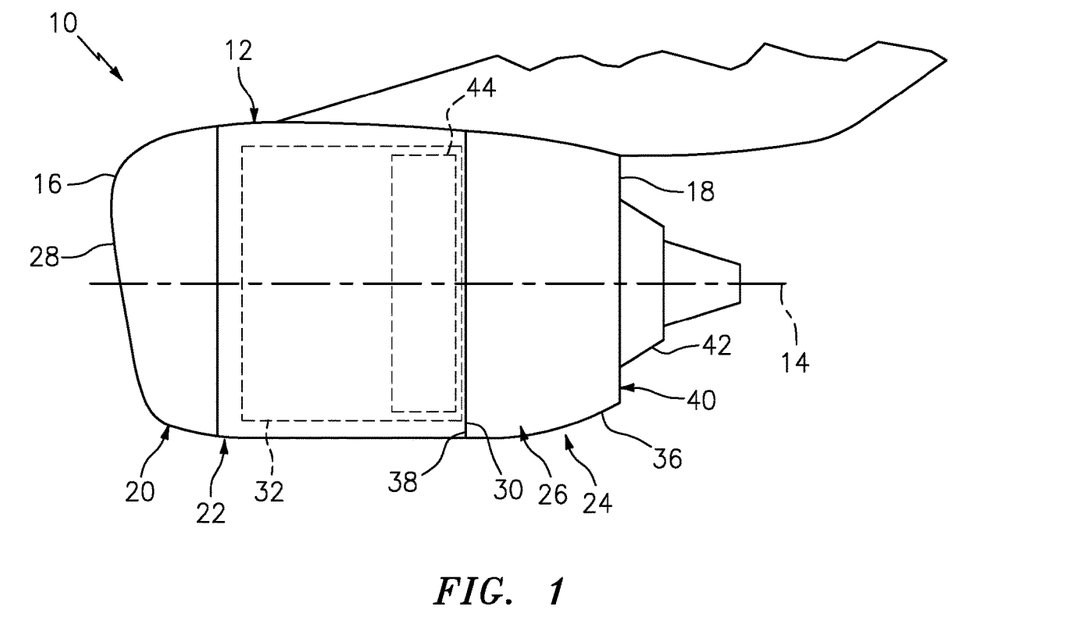
FIG. 1 is a schematic illustration of an aircraft propulsion system with a thrust reverser in a stowed position, in accordance with various embodiments.

FIG. 1 illustrates an aircraft propulsion system 10 for an aircraft such as, but not limited to, a commercial airliner or cargo plane. The propulsion system 10 includes a nacelle 12 and a gas turbine engine. This gas turbine engine may be configured as a high-bypass turbofan engine. Alternatively, the gas turbine engine may be configured as any other type of gas turbine engine capable of propelling the aircraft during flight.

The nacelle 12 is configured to house and provide an aerodynamic cover for the gas turbine engine. An outer structure of the nacelle 12 extends along an axial centerline 14 between a nacelle forward end 16 and a nacelle aft end 18. The nacelle 12 of FIG. 1 includes a nacelle inlet structure 20, one or more fan cowls 22 (one such cowl visible in FIG. 1) and a nacelle aft structure 24, which is configured as part of or includes a thrust reverser 26.

The inlet structure 20 is disposed at the nacelle forward end 16. The inlet structure 20 is configured to direct a stream of air through an inlet opening 28 at the nacelle forward end 16 and into a fan section of the gas turbine engine.

The fan cowls 22 are disposed axially between the inlet structure 20 and the aft structure 24. Each fan cowl 22 of FIG. 1, in particular, is disposed at (e.g., on, adjacent or proximate) an aft end 30 of a stationary portion of the nacelle 12, and extends forward to the inlet structure 20. Each fan cowl 22 is generally axially aligned with a fan section of the gas turbine engine. The fan cowls 22 are configured to provide an aerodynamic covering for a fan case 32 as well as components of the thrust reverser 26 as described further below. Briefly, this fan case 32 circumscribes the fan section and partially forms a forward outer peripheral boundary of a bypass flowpath 34 (see FIG. 3) of the propulsion system 10.

The term "stationary portion" is used above to describe a portion of the nacelle 12 that is stationary during propulsion system 10 operation (e.g., during takeoff, aircraft flight and landing). However, the stationary portion may be otherwise movable for propulsion system 10 inspection/maintenance; e.g., when the propulsion system is non-operational. Each of the fan cowls 22, for example, may be configured to provide access to components of the gas turbine engine such as the fan case 32 and/or peripheral equipment configured therewith for inspection, maintenance and/or otherwise. In particular, each of fan cowls 22 may be pivotally mounted with the aircraft propulsion system 10 by, for example, a pivoting hinge system. Alternatively, the fan cowls 22 and the inlet structure 20 may be configured into a single axially translatable body for example, which may be referred to as a "fanlet". The present disclosure, of course, is not limited to the foregoing fan cowl configurations and/or access schemes.

The aft structure 24 includes a translating sleeve 36 for the thrust reverser 26. The translating sleeve 36 of FIG. 1 is disposed at the nacelle aft end 18. This translating sleeve 36 extends axially along the axial centerline 14 between a forward end 38 thereof and the nacelle aft end 18. The translating sleeve 36 is configured to partially form an aft outer peripheral boundary of the bypass flowpath 34. The translating sleeve 36 may also be configured to form a bypass nozzle 40 for the bypass flowpath 34 with an inner structure 42 of the nacelle 12 (e.g., an inner fixed structure (IFS)), which nacelle inner structure 42 houses a core of the gas turbine engine.

The translating sleeve 36 of FIG. 1 includes a pair of sleeve segments (e.g., halves) arranged on opposing sides of the propulsion system 10 (one such sleeve segment visible in FIG. 1). The present disclosure, however, is not limited to such an exemplary translating sleeve 36 configuration. For example, the translating sleeve 36 may alternatively have a substantially tubular body. For example, the translating sleeve 36 may extend more than three-hundred and thirty degrees (330°) around the centerline 14.

Figure 2:
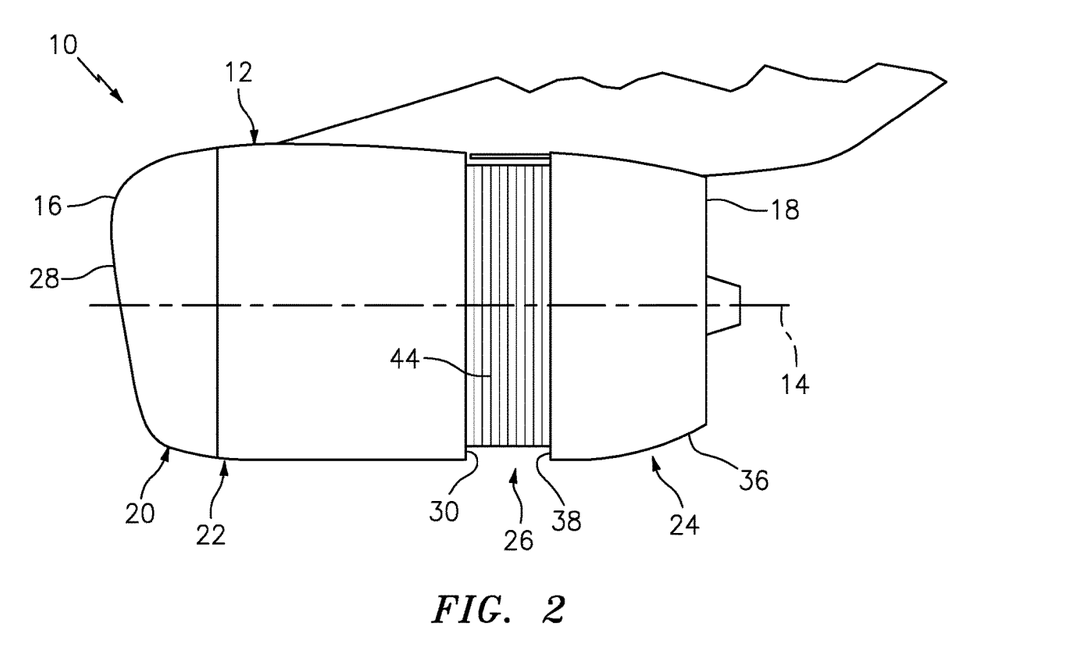
FIG. 2 is a schematic illustration of the aircraft propulsion system with the thrust reverser in a deployed position, in accordance with various embodiments.

Referring to FIGS. 1 and 2, the translating sleeve 36 is an axially translatable structure. Each translating sleeve segment, for example, may be slidably connected to one or more stationary structures (e.g., a pylon and a lower bifurcation) through one or more respective track assemblies. Each track assembly may include a rail mated with a track beam; however, the present disclosure is not limited to the foregoing exemplary sliding connection configuration.

With the foregoing configuration, the translating sleeve 36 may translate axially along the axial centerline 14 and relative to the stationary portion. The translating sleeve 36 may thereby move axially between a forward stowed position (see FIG. 1) and an aft deployed position (see FIG. 2).

In the forward stowed position, the translating sleeve 36 provides the functionality described above. In the aft deployed position, the translating sleeve 36 at least partially (or substantially completely) uncovers at least one or more other components of the thrust reverser 26 such as, but not limited to, a translating cascade structure 44, which may include one or more segments; e.g., halves (one such segment visible in FIG. 2). In addition, as the translating sleeve 36 moves from the stowed position to the deployed position, one or more blocker doors 46 (see FIGS. 3-5) arranged with the translating sleeve 36 may be deployed to divert bypass air from the bypass flowpath 34 and through the cascade structure 44 to provide reverse thrust.

Figure 3:
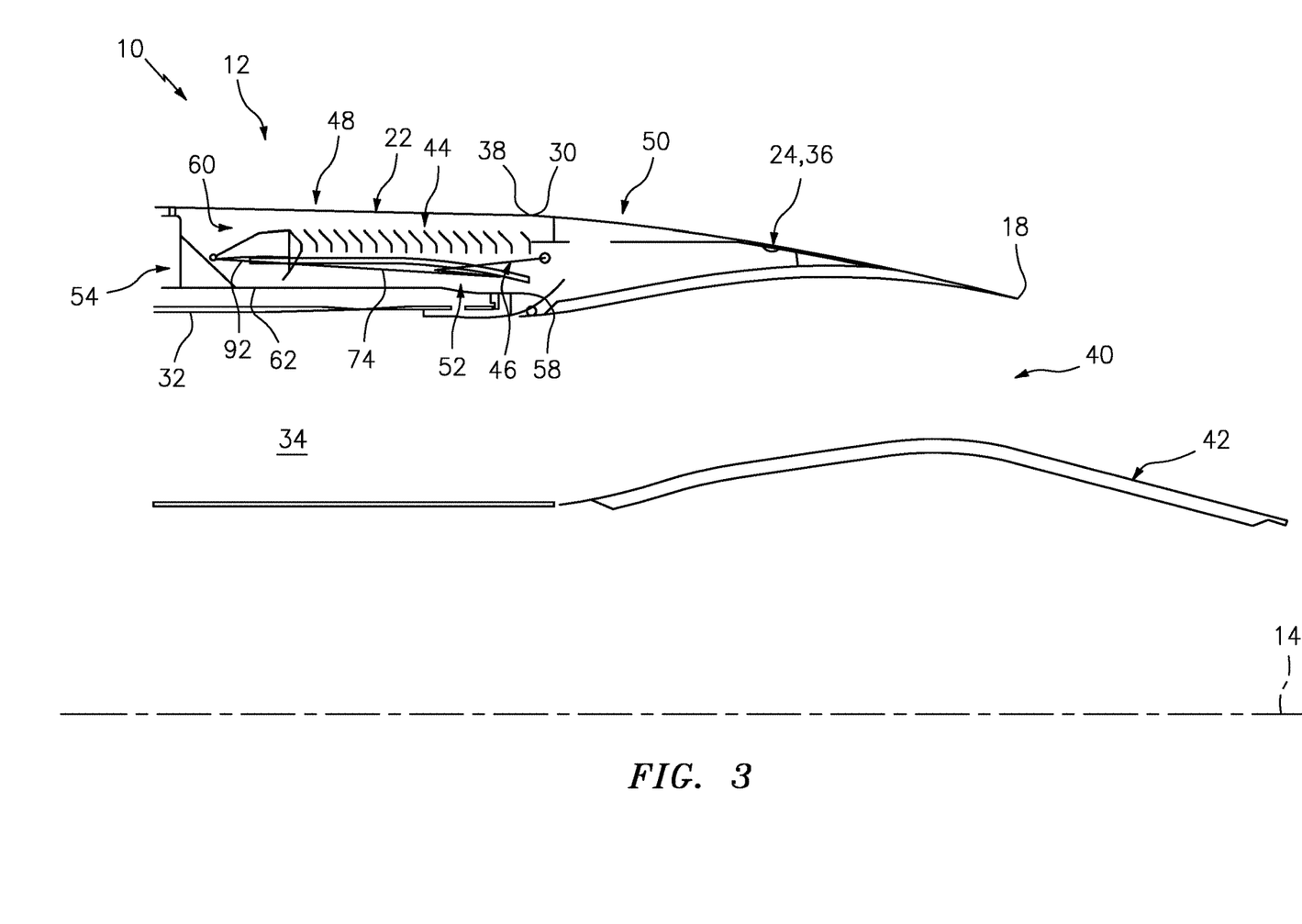
FIG. 3 is a side-sectional illustration of an aft portion of the aircraft propulsion system in FIG. 1 with the thrust reverser in the stowed position, in accordance with various embodiments.
Figure 4:
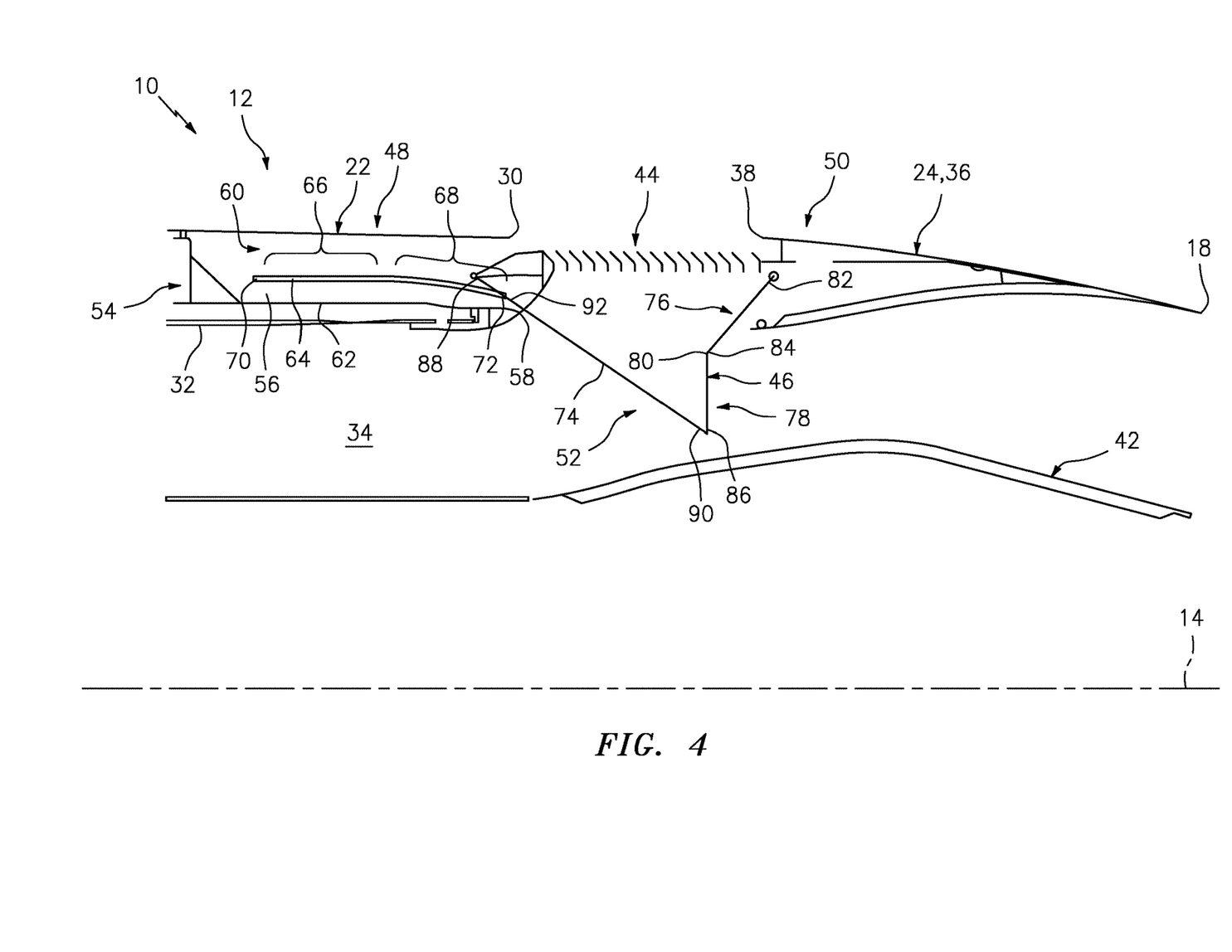
FIG. 4 is a side-sectional illustration of an aft portion of the aircraft propulsion system in FIG. 2 with the thrust reverser in the deployed position, in accordance with various embodiments.

FIG. 3 is a partial side sectional illustration of an assembly for the propulsion system 10 with the thrust reverser 26 in a stowed position. FIG. 4 is a partial side sectional illustration of the assembly with the thrust reverser 26 in a deployed position. This assembly of FIGS. 3 and 4 includes the fan case 32, a nacelle fixed structure 48, a nacelle translating structure 50 and a thrust reverser blocker door assembly 52.

The fixed structure 48 circumscribes and axially overlaps the fan case 32. The fixed structure 48 includes the fan cowls 22 as well as an internal nacelle support structure 54. This support structure 54 provides a radial support for the fan cowls 22. The support structure 54 also provides support for components of the translating structure 50 and the door assembly 52 as described below in further detail.

Figure 5:
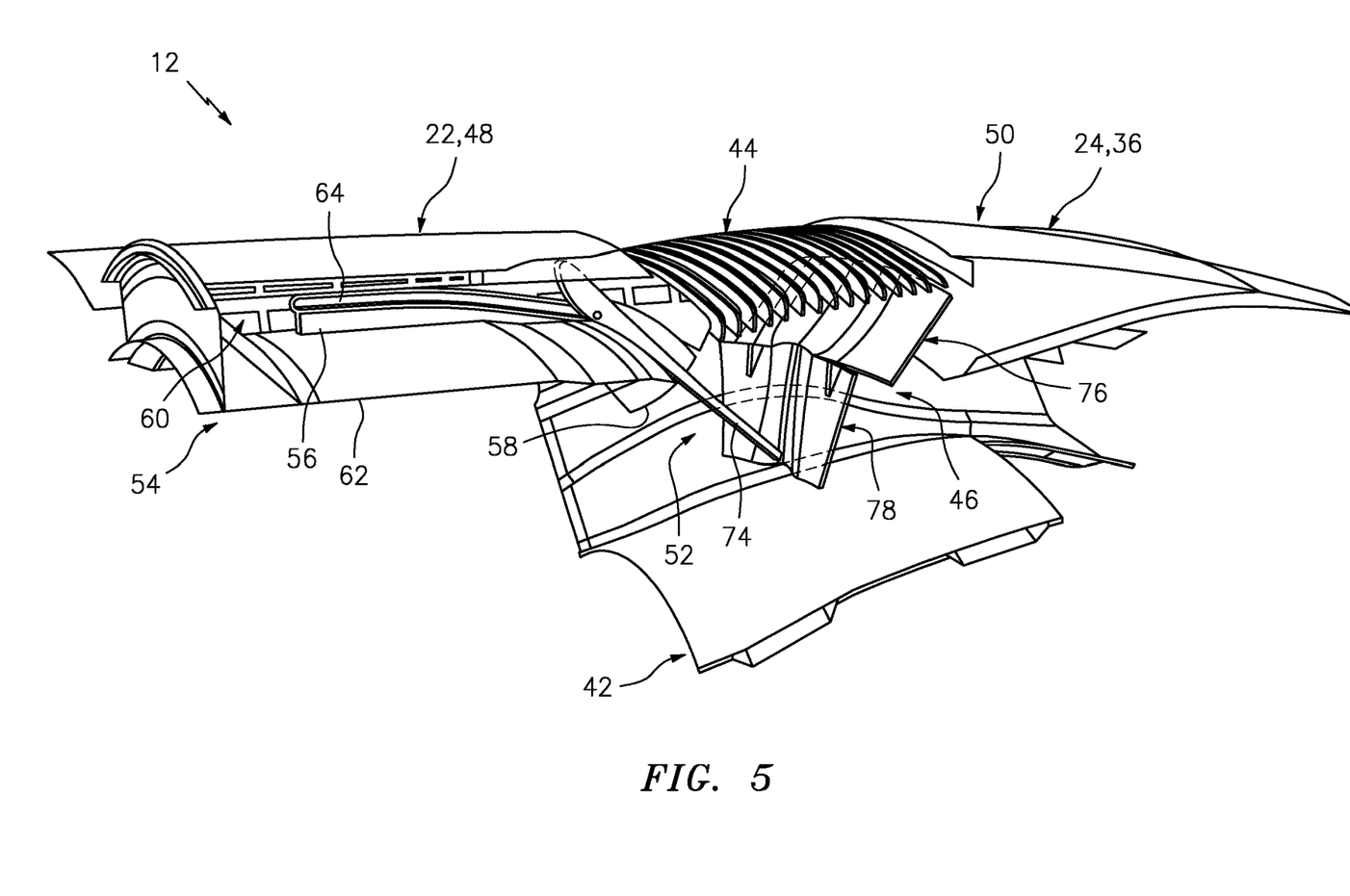
FIG. 5 is a perspective illustration of an aft portion of the aircraft propulsion system in FIG. 2 with the thrust reverser in the deployed position, in accordance with various embodiments.

The support structure 54 of FIGS. 4 and 5 includes one or more circumferentially arranged beams 56 (one visible in FIGS. 4 and 5), a bullnose 58 and one or more internal cavities 60 (one visible in FIGS. 4 and 5). Each internal cavity 60 is radially between the fan cowls 22 and the fan case 32. More particularly, as best seen in FIG. 5, each internal cavity 60 extends radially between a respective fan cowl 22 and an inner liner 62 of the fixed structure 48. Each internal cavity 60 extends axially forward into the fixed structure 48 from the aft end 30 of the stationary portion of the nacelle 12. Each internal cavity 60 extends circumferentially about the centerline 14 within the fixed structure 48.

Each beam 56 is disposed within a respective one of the internal cavities 60 of the nacelle 12. Each beam 56 is attached to the inner liner 62 of the fixed structure 48 and/or any other one or more elements of the support structure 54. Each beam 56 of FIG. 5 projects radially outward from the inner liner 62. Each beam 56 includes a track 64, which may be configured as a slot. A first (e.g., forward) portion 66 of the track 64 may follow a substantially straight-line trajectory, which may be substantially (e.g., +/−5 degrees) parallel with the centerline 14. Referring to FIG. 4, a second (e.g., aft) portion 68 of the track 64 may, by contrast, follow a curved (e.g., arcuate) trajectory, which curved trajectory curves radially inward as it extends axially away from the first portion 66. The first portion 66 of the track 64 extends axially from a first (e.g., forward) end 70 of the track 64 to the second portion 68 of the track 64. The second portion 68 of the track 64 extends axially from the first portion 66 of the track 64 to a second (e.g., aft) end 72 of the track 64. A length of the first portion 70 of the track 64 may be different (e.g., greater) than, or alternatively equal to, a length of the second portion 68 of the track 64. For example, the first portion 70 length may be at least sixty percent of an entire length of the track 64. However, the present disclosure is not limited to such an exemplary embodiment.

The bullnose 58 is arranged at the aft end 30 of the stationary portion of the nacelle 12. The bullnose 58 is attached to an aft end of the inner liner 62 and may also be attached to aft ends of the beams 56. The bullnose 58 is configured to provide a smooth aerodynamic transition from a bypass flowpath 34 of the aircraft propulsion system 10 to a thrust reverser duct.

The translating structure 50 includes the translating sleeve 36 and the translating cascade structure 44. In the embodiment of FIGS. 3 and 4, an aft end of the translating cascade structure 44 is connected to the forward end 38 of the translating sleeve 36; however, in other embodiments, the cascade structure 44 may be a fixed cascade structure and attached to the support structure 54. With this configuration, the translating cascade structure 44 is configured to translate axially with the translating sleeve 36 between the stowed position of FIG. 3 and the deployed position of FIG. 4. The translating cascade structure 44 includes one or more arrays of cascades.

The door assembly 52 of FIG. 4 includes the one or more folding blocker doors 46 (one visible in FIG. 4), which are arranged circumferentially about the centerline 14. It should be noted, while each blocker door 46 is illustrated in the drawings and described herein as being a folding blocker door, each blocker door 46 may alternatively be configured as a single panel (i.e., non-folding, rigid) blocker door in other embodiments. The thrust reverser 26 of the present disclosure, therefore, is not limited to the present folding blocker door exemplary embodiment. The door assembly 52 of FIG. 4 also includes at least one linkage 74 associated with each folding blocker door 46.

Each folding blocker door 46 may be configured as a bi-folding blocker door. Each folding blocker door 46 of FIG. 4, for example, includes an outer panel 76 and an inner panel 78. The outer panel 76 extends laterally (e.g., circumferentially or tangentially) between opposing lateral outer panel sides. The outer panel 76 extends longitudinally between a first (e.g., forward) outer panel end 80 and a second (e.g., aft) outer panel end 82. The inner panel 78 extends laterally between opposing lateral inner panel sides. The inner panel 78 extends longitudinally between a first (e.g., forward) inner panel end 84 and a second (e.g., aft) inner panel end 86. Each folding blocker door thereby extends longitudinally between opposing blocker door ends (e.g., the ends 82 and 86) when deployed.

The outer panel 76 is configured between and pivotally attached to the translating structure 50 and the inner panel 78. In particular, the outer panel 76 is pivotally attached (e.g., hinged) to the translating structure 50 (e.g., the sleeve 36 and/or cascade structure 44) at its second outer panel end 82. The outer panel 76 is pivotally attached (e.g., hinged) to the inner panel 78 at its first outer panel end 80, where the inner panel 78 is correspondingly pivotally attached to the outer panel 76 at its first inner panel end 84. The hinged connection between the outer panel 76 and the inner panel 78 is configured such that, when the folding blocker door 46 is folded, the hinged connection is forward and upstream of the other ends 82 and 86 of the panels 76 and 78.

The linkage 74 is configured as a rigid unitary body; e.g., a single inflexible arm. The linkage 74 extends between a first (e.g., forward) linkage end 88 and a second (e.g., aft) linkage end 90. The linkage 74 is pivotally attached to the translating structure 50 via a pivot attachment, which is located at the first linkage end 88 and, for example, a forward end of the cascade structure 44. The linkage 74 is pivotally attached to the inner panel 78 via a pivot attachment, which is located at the second linkage end 90 and the second inner panel end 86. The linkage 74 is pivotally attached to the fixed structure 48 and, more particularly, a carriage 92 via a pivot attachment, which is located at a position intermediate between the first linkage end 88 and the second linkage end 90. The carriage 92 is mated with the track 64, and is configured to move longitudinally along and within the track 64 between the first end 70 and the second end 72. In the embodiment of FIG. 3, the carriage 92 is configured as a roller; however, the present disclosure is not limited to such an exemplary carriage configuration. For example, in other embodiments, the carriage 92 may be configured as a slide.

Figure 6A:
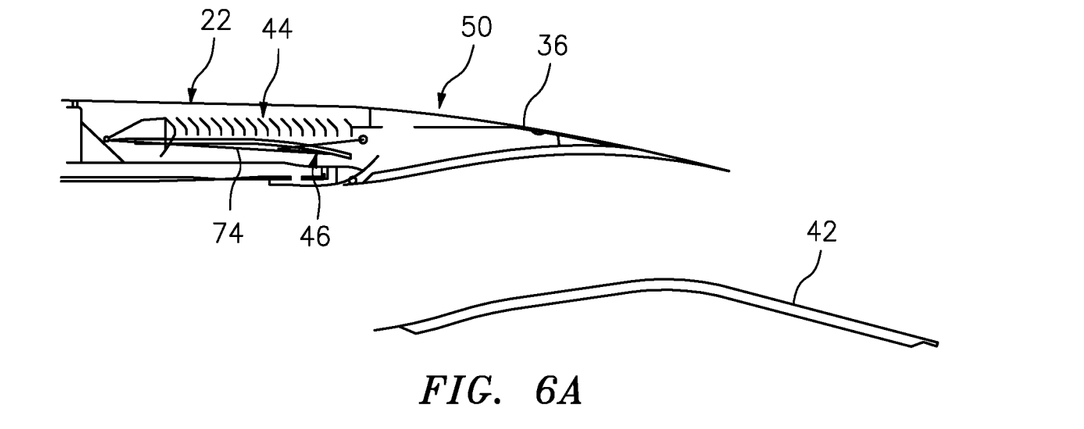
FIGS. 6A-6F illustrate a sequence of the thrust reverser moving from a stowed position to a deployed position, in accordance with various embodiments.
Figure 6B:
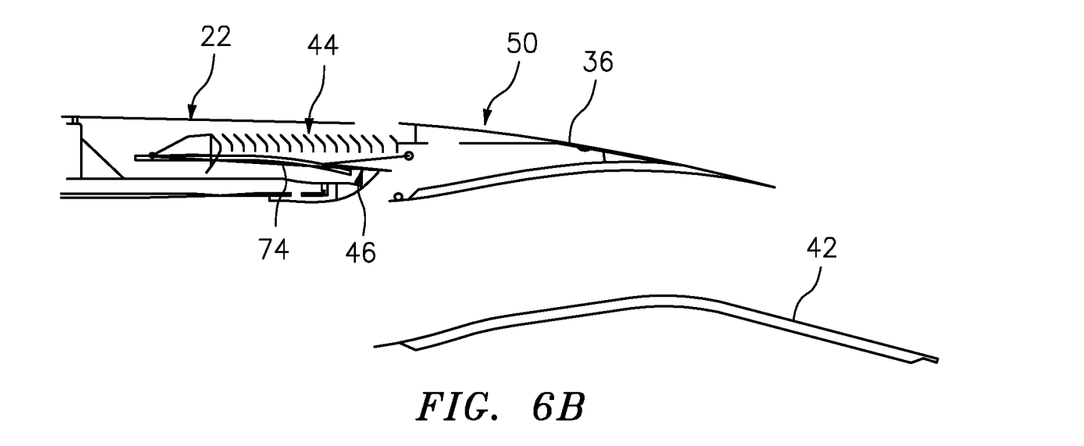
Figure 6C:
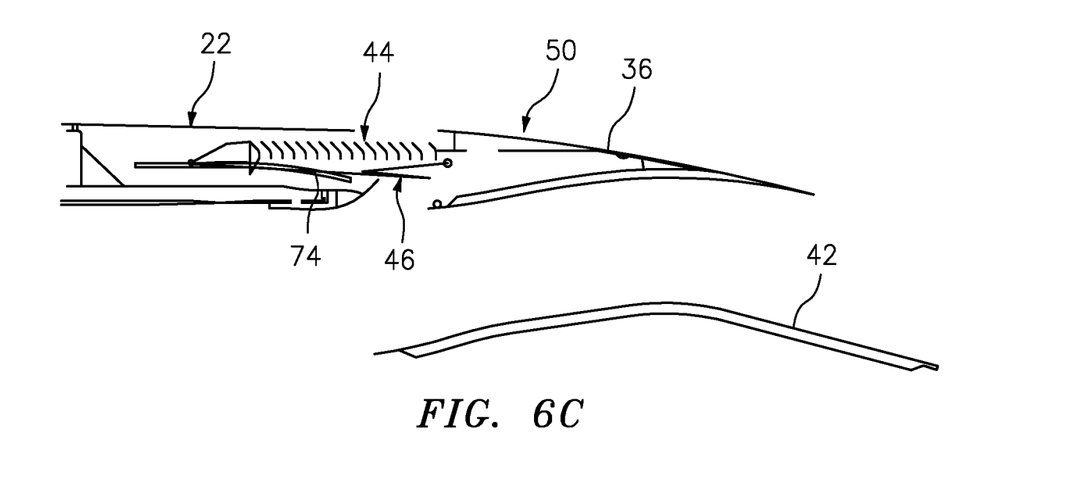
Figure 6D:
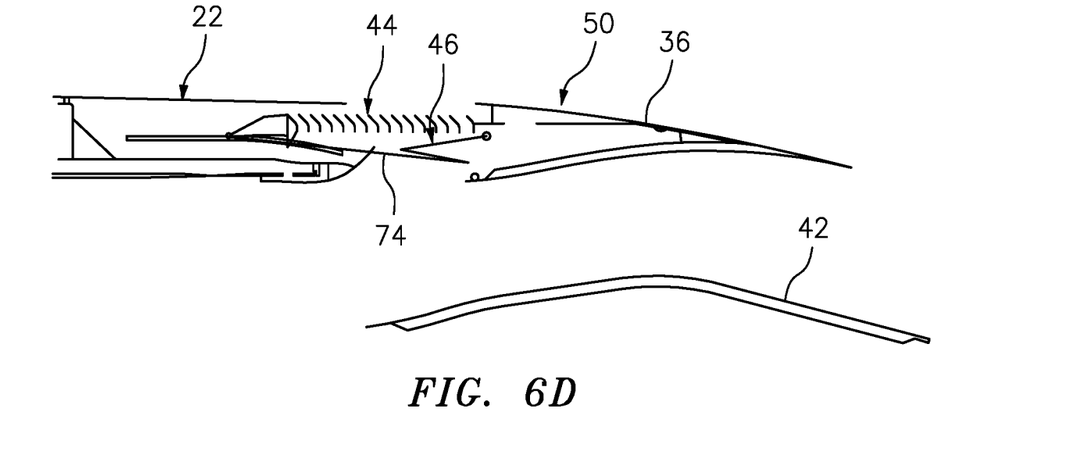
Figure 6E:
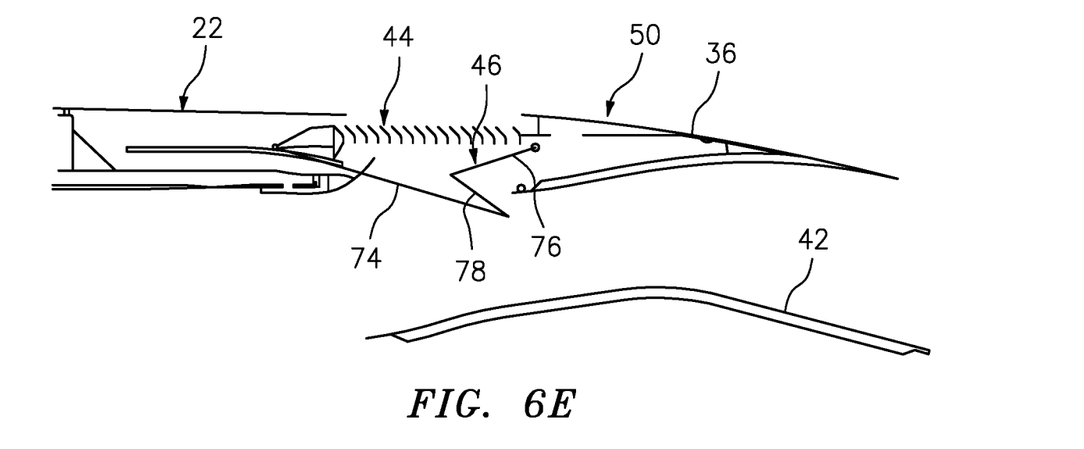
Figure 6F:
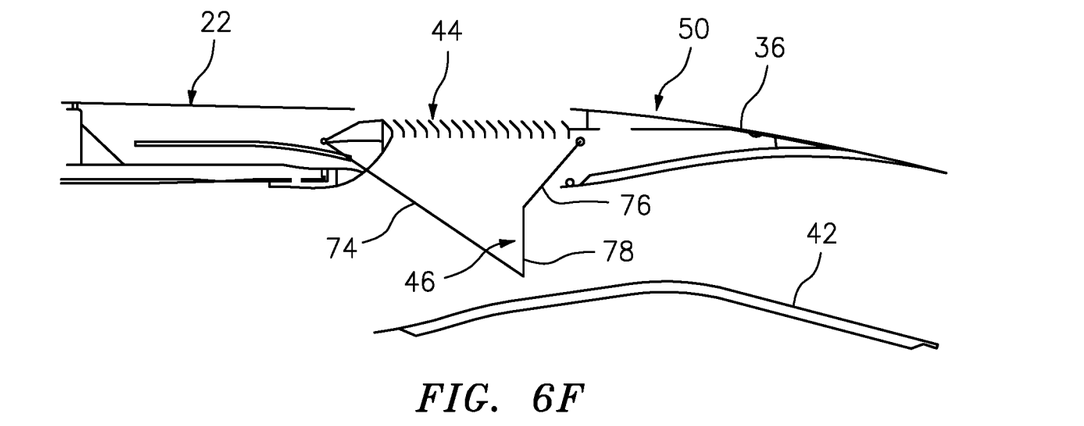

FIGS. 6A-F illustrate a sequence of the thrust reverser deploying, where the translating structure 50 is in its stowed position in FIG. 6A and the translating structure 50 is in its deployed position in FIG. 6F. In the stowed position of FIG. 6A, each folding blocker door 46 and linkage 74 is folded and disposed within a respective internal cavity 60. With this configuration, the fan case 32, the bullnose 58 and the translating sleeve 36 form an outer peripheral boundary of the bypass flowpath 34 and the doors 46 and the linkages 74 are hidden from (e.g., outside of) the bypass flowpath 34. The segments of the cascade structure 44 are also disposed within the internal cavities 60.

During deployment, movement of the folding blocker doors 46 is actuated by axial movement of the translating structure 50. In particular, as the translating structure 50 moves axially aft from its stowed position towards the deployed position, the translating structure 50 pulls the folding blocker doors 46 aft. The configuration of the track 64 and the linkage 74 enable the folding blocker door 46 to move from its fully stowed position to a partially deployed position (e.g., see FIG. 6C) without unfolding. In other words, the folding blocker door 46 may only translate axially aft with the translating structure 50 until the translating structure 50 reaches an intermediate position (corresponding to the point where the portions 66 and 68 meet) between its stowed position and its deployed position. This translation only movement accounts for a partial stroke length of the translating structure 50 stroke, which may be about fifty percent (e.g., between 40% to 60%) of a full stroke length of the translating structure 50 from the stowed position to the deployed position.

Around the intermediate position of FIG. 6C, the curvature of the track 64 causes the linkage 74 to begin to pivot about the pivot attachment. This pivoting in turn causes the second inner panel end 86 to pivot downwards and into the bypass flowpath 34. The movement of the inner panel 78 simultaneously causes the outer panel 76 to pivot (e.g., pulls the outer panel 76) downwards and into the bypass flowpath 34. In this manner, the linkage 74 is operable to actuate the unfolding of the folding blocker doors 46 as the translating structure 50 axially translates from the intermediate position to the deployed position. The folding blocker doors 46 and at least a portion of each panel 76, 78 thereby project radially downwards into the bypass flowpath 34 for diverting air from the bypass flowpath 34 and into the thrust reverser duct.

The above described thrust reverser includes various benefits. As discussed above, the folding blocker doors 46 and the linkages 74 are hidden from the bypass flowpath 34 when the thrust reverser is stowed. Because the folding blocker doors 46, the linkages 74 and the cascade structure 44 are located in the internal cavity 60 above the fan case 32, an overall length of the translating sleeve 36 and, thus, the bypass flowpath 34 may be reduced. In addition, steps and gaps associated with traditional non-hidden doors and linkages may be reduced or eliminated. This also provides additional space on the translating sleeve 36 for sound attenuation panels; e.g., areas that would otherwise be occupied by non-hidden doors in a traditional thrust reverser. The folding doors 46 also enable improved coverage by reducing leakage of reverse thrust.

In some embodiments, the elements (e.g., 36, 74, 76 and 78) may be configured together as a four-bar link system. For example, each blocker door 46 and associated linkage 74 may act as a four-bar link system that is ruled by a track geometry ruling the position of the first pivot (e.g., at 92) upon the fixed structure 48.

Figure 7A:
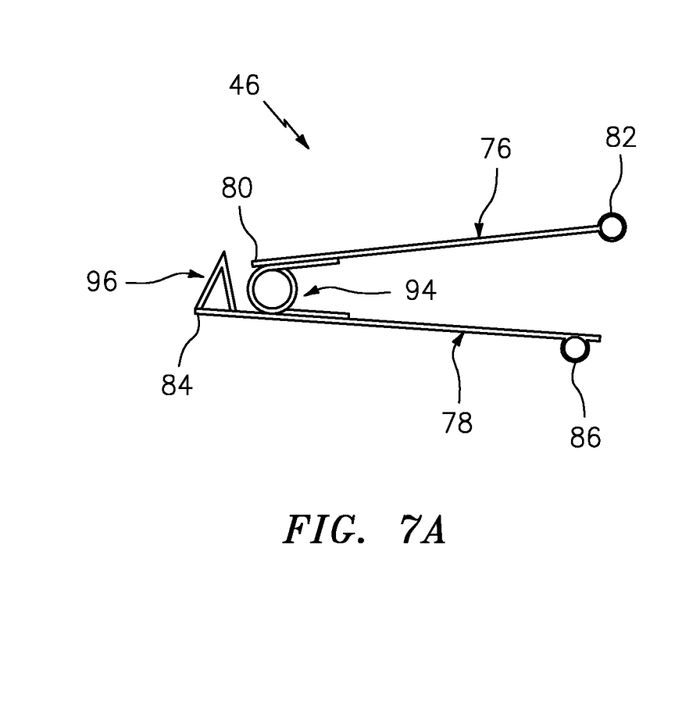
FIG. 7A illustrates an alternative thrust reverser door in a stowed position, in accordance with various embodiments.
Figure 7B:
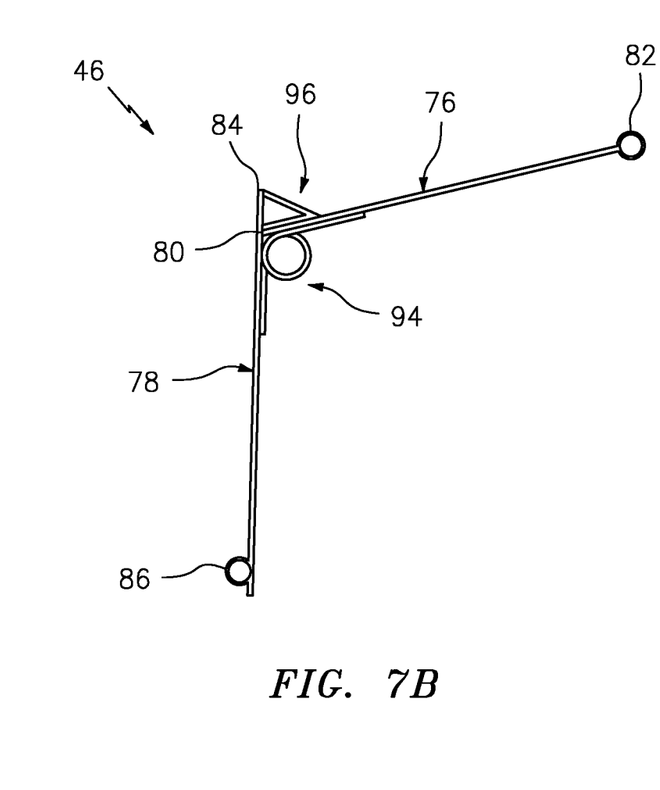
FIG. 7B illustrates the thrust reverser door of FIG. 7A in a deployed position, in accordance with various embodiments.

In some embodiments, for example referring to FIGS. 7A and 7B, each blocker door 46 may be configured with a biasing (e.g., pre-load) device 94 and/or a stop 96. An example of the biasing device 94 is a torsional spring; however, the biasing device 94 may alternatively be configured as another type of spring or any other device capable of providing a resilient bias force. The biasing device 94 of FIGS. 7A and 7B is located at (e.g., proximate) the panel ends 80 and 84. The biasing device 94 is configured to exert a bias force between the panels 76 and 78 so as to cause or otherwise facilitate the panels 76 and 78 to pivot away from one another. The stop 96 may be configured to limit the pivoting between the panels 76 and 78 when fully deployed. The stop 96 may prevent the panels 76 and 78 from being over pivoted into an unstable configuration. In the embodiment of FIGS. 7A and 7B, the stop 96 is configured as a projection, which is configured with (e.g., attached to or integral with) the panel 78 at the end 84.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a fixed structure;
   a translating structure configured to translate relative to the fixed structure;
   a blocker door extending between a blocker door first end and a blocker door second end, the translating structure pivotally attached to the blocker door at the blocker door first end; and
   a rigid linkage comprising
      a first pivot attachment coupled to the fixed structure;
      a second pivot attachment coupled to the translating structure; and
      a third pivot attachment coupled to the blocker door at the blocker door second end;
   wherein the blocker door is configured as a folding blocker door comprising an outer panel and an inner panel, the outer panel is configured between and pivotally attached to the translating structure and the inner panel, and the third pivot attachment is coupled to the inner panel; and
   the outer panel, the inner panel, the translating structure and the rigid linkage are configured together as a four-bar link system.

2. The assembly of claim 1, wherein
   the rigid linkage extends between a first linkage end and a second linkage end;

the first pivot attachment is between the second pivot attachment and the third pivot attachment;
the second pivot attachment is at the first linkage end; and
the third pivot attachment is at the second linkage end.

3. The assembly of claim 1, wherein the first pivot attachment comprises a carriage that rides within a track of the fixed structure.

4. The assembly of claim 3, wherein the carriage comprises a roller.

5. The assembly of claim 3, wherein a first portion of the track follows a straight trajectory and a second portion of the track follows a curved trajectory.

6. The assembly of claim 1, wherein the outer panel extends between a first outer panel end and a second outer panel end, the outer panel is pivotally attached to the inner panel at the first outer panel end, and the outer panel is pivotally attached to the translating structure at the second outer panel end.

7. The assembly of claim 6, wherein the first outer panel end is axially forward and radially inward of the second outer panel end with respect to a centerline of the aircraft propulsion system when the folding blocker door is in the deployed position.

8. The assembly of claim 1, wherein the translating structure comprises a translating cascade structure.

9. The assembly of claim 1, further comprising a biasing device configured to bias the inner panel away from the outer panel.

10. The assembly of claim 1, further comprising a stop configured to limit pivoting between the inner panel and the outer panel.

11. An assembly for an aircraft propulsion system, comprising:
a fixed structure comprising a track;
a translating structure configured to translate relative to the fixed structure;
a blocker door pivotally attached to the translating structure; and
a linkage including a first pivot attachment, a second pivot attachment and a third pivot attachment;
the first pivot attachment comprising a carriage coupled with and adapted to ride along the track;
the second pivot attachment coupled to the translating structure; and
the third pivot attachment coupled to the blocker door at a blocker door second end;
wherein the blocker door is configured as a folding blocker door comprising an outer panel and an inner panel, the outer panel is configured between and is pivotally attached to the translating structure and the inner panel, and the third pivot attachment is coupled to the inner panel; and
the outer panel, the inner panel, the translating structure and the linkage are configured together as a four-bar link system.

12. The assembly of claim 11, wherein a first portion of the track follows a straight trajectory and a second portion of the track follows a curved trajectory.

13. The assembly of claim 12, wherein the first portion is substantially parallel with a centerline of the aircraft propulsion system, and the second portion curves radially inward towards the centerline as the second portion extends axially away from the first portion.

14. The assembly of claim 11, wherein
the linkage extends between a first linkage end and a second linkage end;
the first pivot attachment is between the second pivot attachment and the third pivot attachment;
the second pivot attachment is at the first linkage end; and
the third pivot attachment is at the second linkage end.

15. The assembly of claim 11, wherein the second pivot attachment directly and pivotally couples the linkage to the translating structure.

16. The assembly of claim 11, wherein the second pivot attachment is located radially outboard of the first pivot attachment with respect to a centerline of the aircraft propulsion system and decoupled from the track when the blocker door is deployed into a bypass flowpath of the aircraft propulsion system.

17. An assembly for an aircraft propulsion system, comprising:
a fixed structure;
a translating structure configured to translate relative to the fixed structure;
a blocker door extending between a blocker door first end and a blocker door second end, the translating structure pivotally attached to the blocker door at the blocker door first end; and
a rigid linkage comprising
a first pivot attachment coupling the rigid linkage to the fixed structure;
a second pivot attachment directly and pivotally coupling the rigid linkage to the translating structure; and
a third pivot attachment directly and pivotally coupling the rigid linkage to the blocker door at the blocker door second end;
wherein the blocker door is configured as a folding blocker door comprising an outer panel and an inner panel, the outer panel is configured between and is pivotally attached to the translating structure and the inner panel, and the third pivot attachment is coupled to the inner panel; and
the outer panel, the inner panel, the translating structure and the rigid linkage are configured together as a four-bar link system.

18. The assembly of claim 17, wherein the first pivot attachment comprises a carriage that rides within a track of the fixed structure.

19. The assembly of claim 18, wherein the second pivot attachment is radially outboard of the first pivot attachment with respect to a centerline of the aircraft propulsion system when the blocker door is deployed.

* * * * *